> United States Patent Office 3,555,608
Patented Jan. 19, 1971

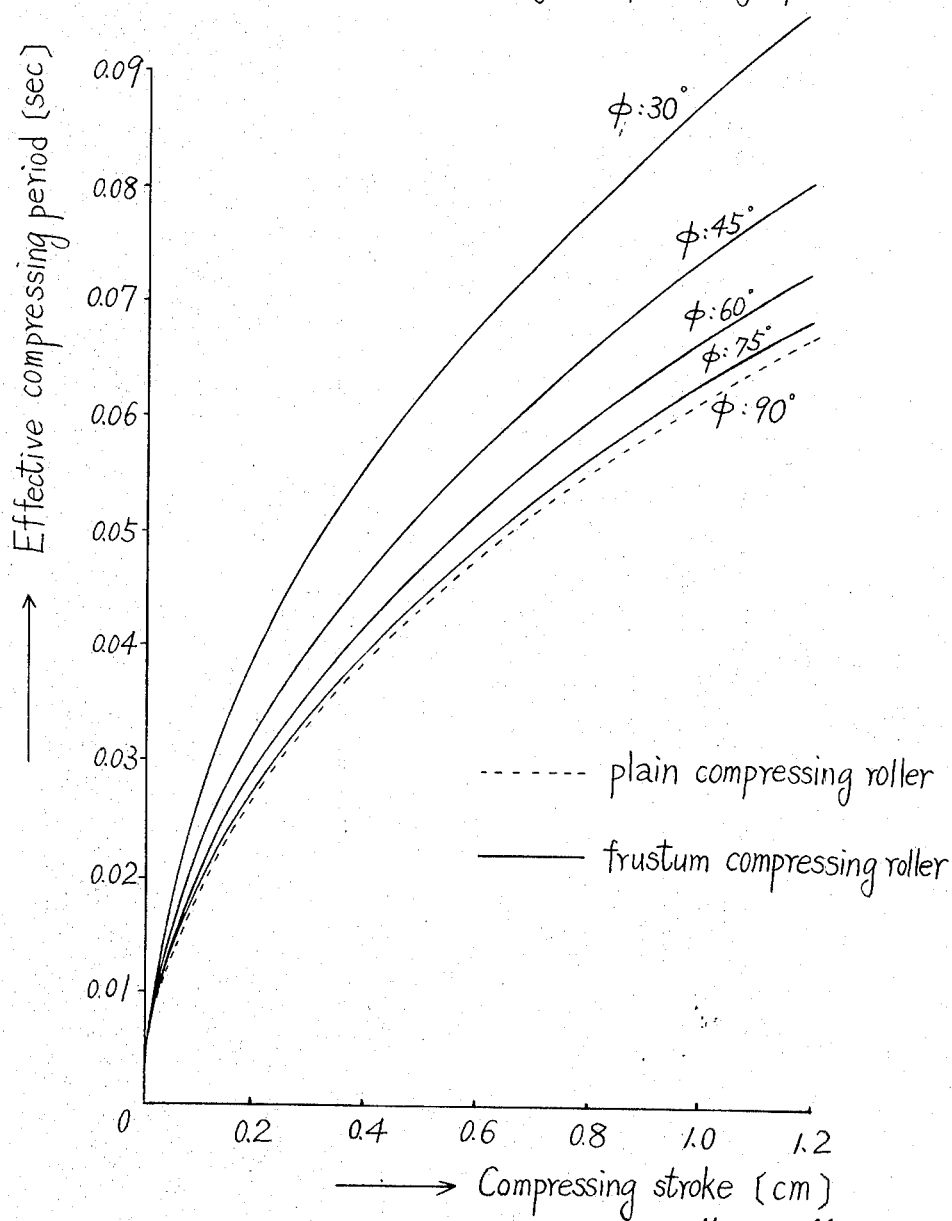
FIG. 2 Relationship between the angle $\phi$ and Effective compressing period in one stage compressing operation

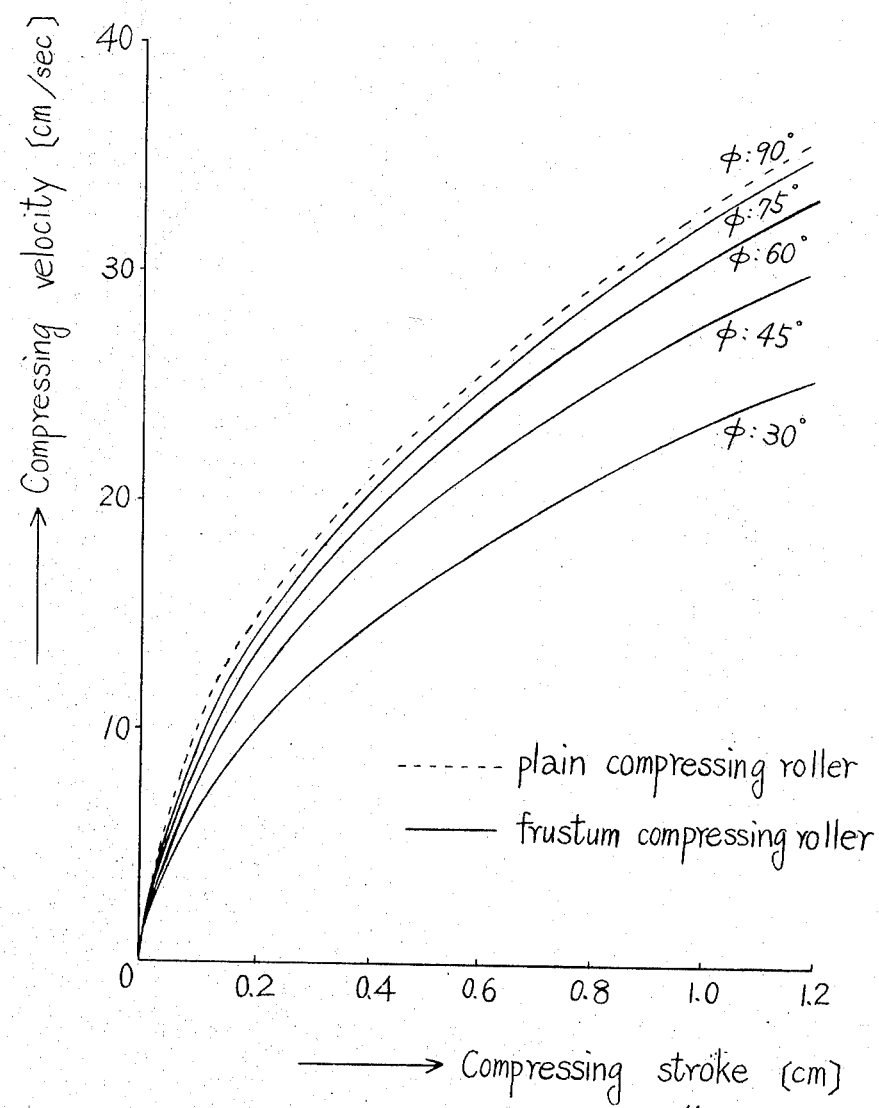
FIG. 3  Relationship between the angle $\phi$ and the compressing velocity in one stage compressing operation

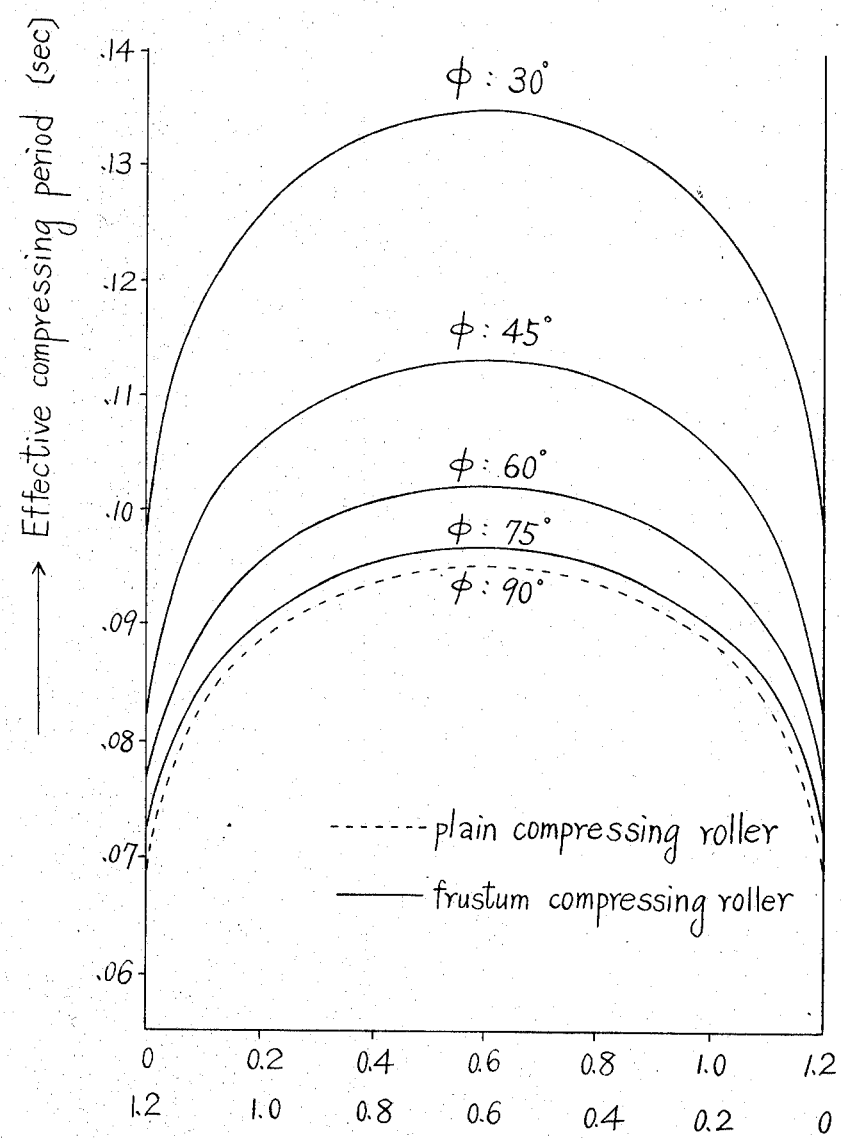
FIG. 4 Relationship between the angle $\phi$ and the Effective compressing period in two stage compressing operation

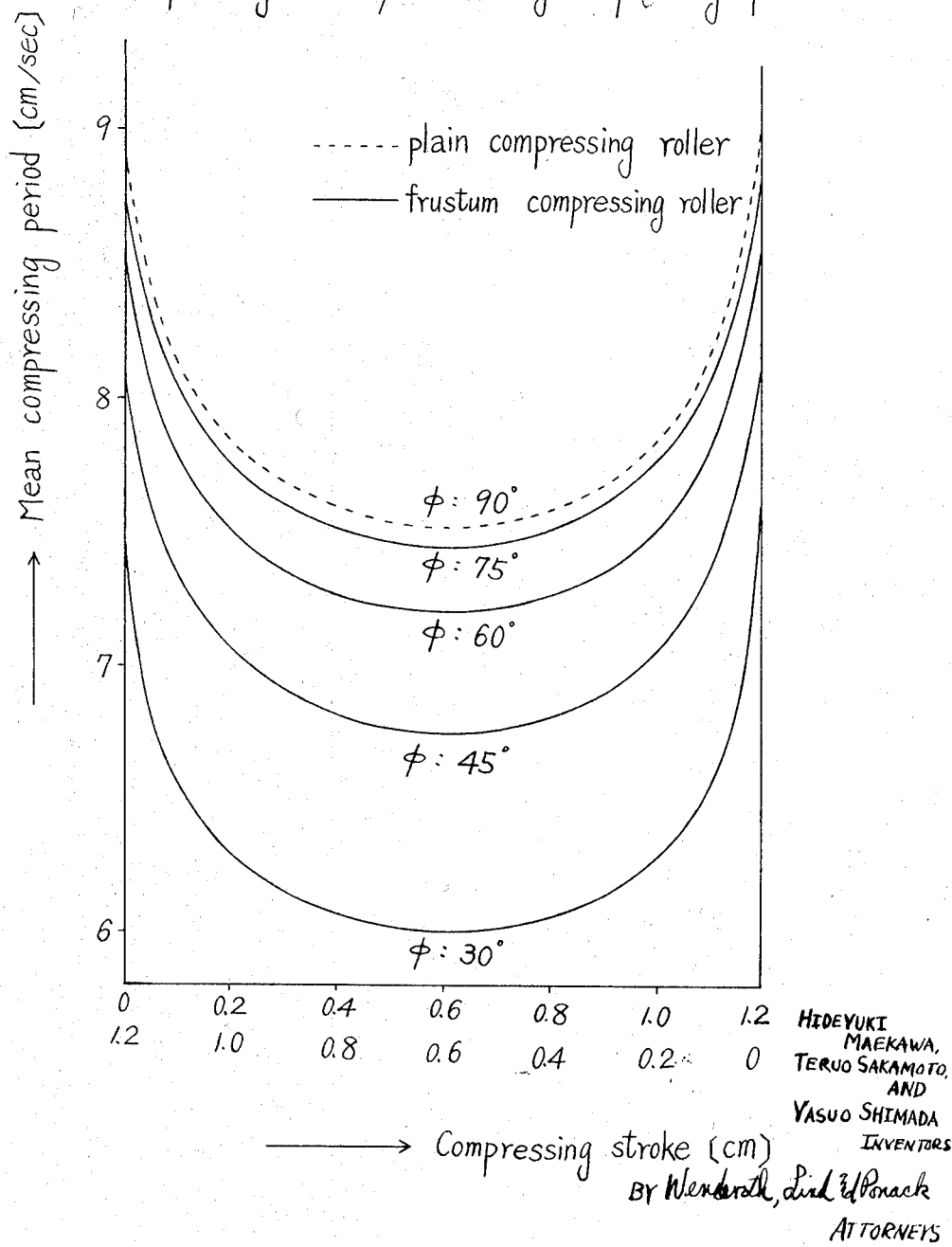
FIG. 5 Relationship between the angle $\phi$ and the mean compressing velocity in two stage compressing operation

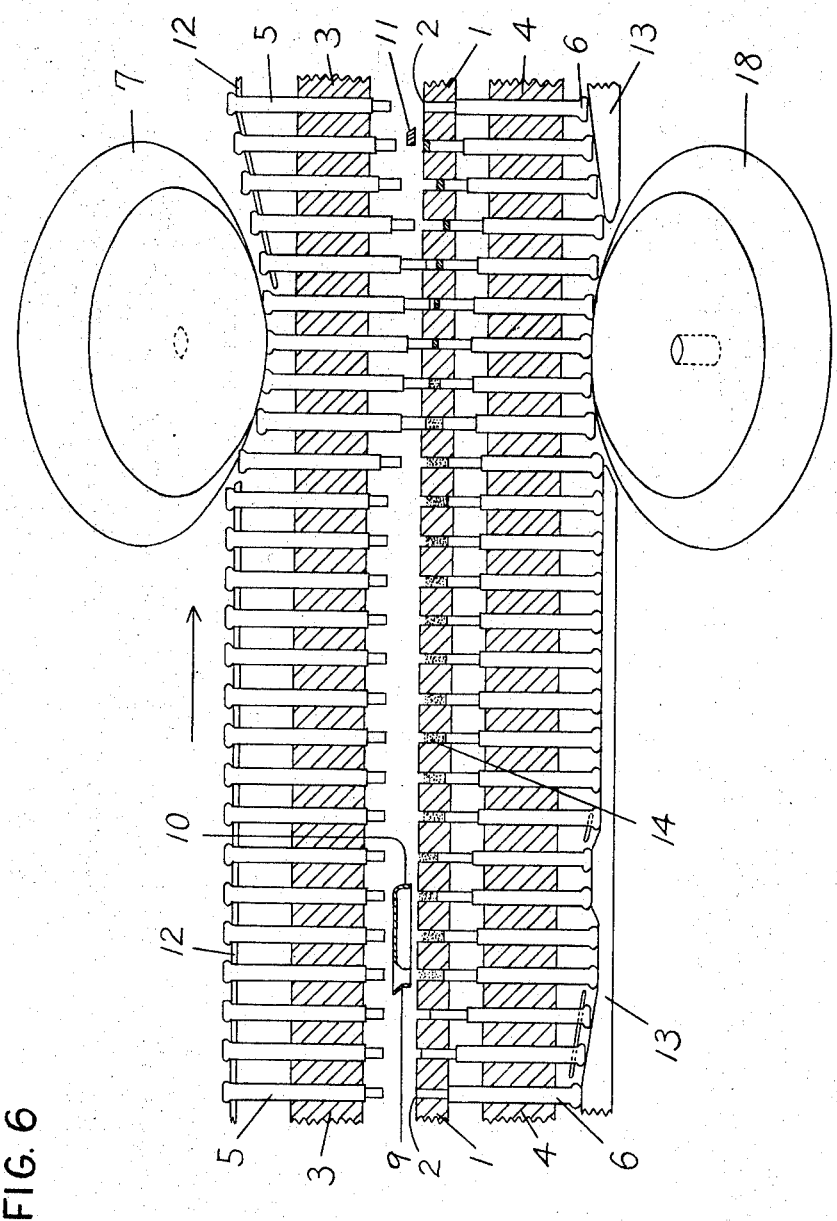

3,555,608
APPARATUS FOR PRODUCING
MOLDED ARTICLE
Hideyuki Maekawa, Osaka-shi, Teruo Sakamoto, Hirakata-shi, and Yasuo Shimada, Kyoto-shi, Japan, assignors of one-half each to Shionogi & Co., Ltd., Osaka, and Kabushiki Kaisha Kikusui Seisakusho, Nakagyo-ku, Nyoto, Japan
Filed Oct. 12, 1967, Ser. No. 674,904
Claims priority, application Japan, Oct. 12, 1966, 41/67,315
Int. Cl. B29c 3/00
U.S. Cl. 18—20           2 Claims

ABSTRACT OF THE DISCLOSURE

Loci including elliptic curves, along which punches are periodically transferred by which they are axially and reciprocatively moved with respect to die cavities are employed for effective production of molded articles, the loci being brought on by employing compressing rollers having shapes of conical frustum and being mounted obliquely on the body of the machine.

BACKGROUND OF THE INVENTION

Field of the invention

This invention generally relates to production of molded articles such as tablets of medicine and has for its object the provision of an improved apparatus for the production of such articles. Particularly, the invention concerns a novel apparatus capable of producing excellent quality tablets by a compressing operation of fewer stages and with a comparatively high tableting speed.

Throughout this specification and the appended claims, the term "tablet" will be understood to include any compressed moldings of food, medicine, powdered metal, ceramics and plastics, some of which are mechanically compressed to form sufficiently firm bondings among their particles prior to sintering thereof and/or coating thereover, and the term "tableting" will be understood to include any process for producing the aforedefined moldings.

Description of the prior art

As is well known, tablets of various materials have been, and are now, made in tableting machines of the die and punch type in which a plurality of die cavities in a die block which ordinarily takes the shape of a turntable are filled with the material to be tableted and the material in each cavity is then subjected to compacting and molding pressure exerted upon it by reciprocatively moving upper and lower punches so associated and so movable with respect to the die cavity and to each other that after the molding of the tablets has been completed one of such punches, usually the lower punch, will serve to eject the tablet from the cavity, and such movements of the punches are usually effected by a pair or pairs of compressing rollers, each of which is kept in close contact with the roots of the punches to exert pressure thereon.

In tablet production employing the aforementioned die and punch type machines, it has heretofore been known that the compressing velocity of the complementary upper and lower punches should be kept as low as possible and the period of time each of these punches spends in the die cavity in the proximity of compacting position (hereinafter, we simply refer to this by the term "effective compressing period" which will be specifically defined for this invention later) should be as long as possible. These conditions are believed to be desirable for tablet production of excellent quality.

To this end, sequential compressing by means of a multiplicity of compressing rollers of the same diameter or different diameters, a specifically elaborated contour of the guide rail for the punches have hitherto been used. It is however extremely difficult to equip a single machine with many pairs of compressing rollers for this purpose because of its space limitation; conversely, a larger dimension of the turntable which becomes the die cavities inevitably makes the whole machine inconvenient to handle. On the other hand, guiding of the punches by means of a guide rail can be effected only by a slip contact and cannot serve for effective compressing without ignoring the wearing both of the roots of punches and the guide rails. Furthermore, a conventional plain cylindrical roller (hereinafter, we simply refer to this as a "plain roller") having a rotational axis which is perpendicular to the axis of the turntable has an inherent disadvantage that the large slip between the contacting surface of the roller and the roots of the punches will increase the wearing of both parts. Moreover, since this slip causes a pinch stress on the punches, any increase in the tableting speed is rather small, especially in case of manufacturing tablets having any shape other than circular, for example square or elliptic tablets, which do not allow any rotational movement of the operative heads of punches inside the die cavities.

SUMMARY OF THE INVENTION

It is therefore the primary object of this invention to provide an apparatus for tablet production capable of greater compacting performance with fewer compressing stages. Another object of this invention is to provide an apparatus for tablet production which can minimize wear of the roots of punches and of compressing rollers. Another object of this invention is to provide an apparatus for tablet production capable of producing tablets having a variety of shapes, for example, square tablets and elliptic tablets, at a higher operational speed than heretofore.

BRIEF DESCRIPTION OF THE DRAWINGS

These and other objects of this invention and attendant advantages thereof will be apparent to those who are conversant with the art to which this invention pertains from the following disclosure in the specification and the appended claims taken in conjunction with the accompanying drawings, in which:

FIGS. 2–5 are diagrams elucidating the advantages of this invention wherein;

FIG. 2 illustrates the relationship between the angle $\phi$ of the axis of the rollers with the axis of the rotational structure i.e. the turntable at their intersection, and the effective compressing period; FIG. 3 illustrates the relationship between the angle $\phi$ and the compressing velocity in a one stage compressing operation; the relationships between the angle $\phi$ and the effective compressing period, and the angle $\phi$ and the compressing velocity in a two stage operation are illustrated in FIG. 4 and FIG. 5, respectively.

FIG. 6 is a vertical rectilinear fragmentary sectional view of the rotational structure including turntable and punch blocks extended and projected onto a plane which is tangential to the cylindrical surface containing the pitch circle along which punches and die cavities are transferred at the contacting points of the punches and rollers.

DESCRIPTION OF THE PREFERRED EMBODIMENT

Figure 1:
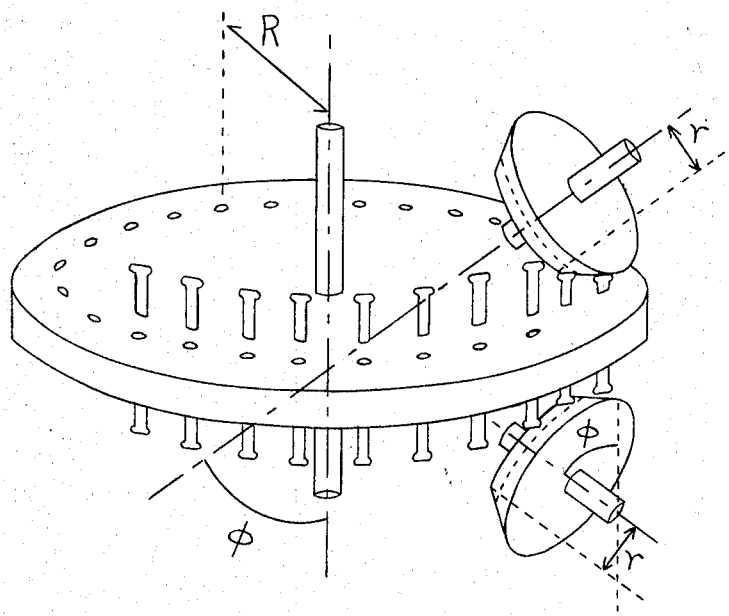
FIG. 1 is a perspective view illustrating the principle of this invention.

The present inventors have assumed and proposed that the effective compressing period and the compressing velocity which are both believed to be the most fundamental characteristics of tableting performance could be much improved by the employment of elliptic loci along which the complementary upper and lower punches are traveling and this has been found generally to be the case.

The apparatus according to this invention includes many of the non-essential commonly known elements which have hitherto been, and are now employed in a conventional punch and die type tableting process and a typical apparatus comprises: a stationary body, a rotational structure (turntable) with a multiplicity of annularly disposed die cavities, complementary upper and lower punches each of which corresponds to and is operative inside each of said die cavities forming generally circular paths, which are expediently referred to as "pitch circles" in this specification, means for filling said cavities with material to be molded, means for effecting axial reciprocative movements of said upper and lower punches which result in compacting and molding of said material, and annular guide rails for effecting auxiliary movements of said punches which result in preparatory positioning of the die cavities for being filled with the material and in ejecting of the molded tablets from the die cavities.

This invention is based on the above findings and primarily characterized in an apparatus wherein said means for effecting said axial reciprocative movements of said punches is a pair or pairs of conical frustum rollers confronting each other mounted obliquely on said stationary body so that each of the axes of rotation of the rollers intersects with that of said rotational structure at an angle other than right angle, and the conical of said rollers being maintained in a close contact with the roots of said punches.

As can be seen from the above description and the drawings, the anlge $\phi$ must not be $\pi/2$ (90°) and the angle ($\pi/2-\phi$) must be equal to the semi-vertical angle of the cone from which the frustum body is formed. The term "two stage operation" refers to a process in which the powder is pressed twice between two pairs of rollers arranged one after the other and spaced-apart at a distance greater than the total of the radii of the rollers along the "pitch circle" which will be defined later.

In order to fully elucidate the improvement that is realized by this invention in terms of "effective compressing period" and "compressing velocity," a comparative study was carried out as follows: in which an apparatus built in accordance with this invention whose operative principle is illustrated in FIG. 1 was compared with a conventional apparatus having loci of complementary upper and lower punches comprising ordinary circular curves.

In FIG. 1, when we assume:

$\phi$: the angle of intersection of the axis of the roller with the axis of the turntable [radian].

$r$: the radius of the circle on the conical surface of the frustum roller along which the roots of punches contact the roller [cm.].

Then the loci of traveling punches can partially be represented by the following equation:

$$\frac{x^2}{r^2}+\frac{y^2}{r^2 \sin^2 \phi}=1$$

Therefore, when we assume:

N: rotational frequency of the turntable [r.p.m.]
R: radius of pitch circle (along which the punches travel) of the turntable [cm.]
$\Delta T$: compressing distance (overall stroke of punches up to the completion of tableting, [cm.]).

in the case of a one stage compressing operation, the mean compressing velocity, $Vm$, [cm., sec.$^{-1}$] can then be expressed as $$Vm = \int_0^{t_0'} V dt/t_0'$$

Wherein compressing velocity, $V$, [cm., sec.$^{-1}$] is represented by $$V = \frac{\pi N}{15} \cdot R^2 r^{-1} \cdot \sin \phi \cdot \sin \frac{\pi N}{30}(t_0'-t)$$

and the effective compressing period (a period of time between the initiation and the completion of the compressing operation) $t_0'$ is represented by $$t_0' = \frac{30}{\pi N} \sin^{-1} \frac{1}{R} \sqrt{\frac{r \cdot \Delta T}{\sin \phi}}$$

[See H. Maekawa et al., A Study on Tablet Production, part 1. Relation between Compressing and Hardness of Tablet: Seizaigaku, vol. 21, No. 3.]

On the other hand, in the case of two stage compression, these components can be expressed irrespective of the interval between the two compressing operations as:

$$Vm = \sum_{i=1}^{2} \int_0^{t_{0i}'} V i dt/t_0' \; [\text{cm., sec.}^{-1}]$$

$$t_0' = \sum_{i=1}^{2} t_{0i} \; [\text{sec.}]$$

$$Vi = \frac{\pi N}{15} \cdot R^2 r^{-1} \sin \phi \cdot \sin \frac{\pi N}{30}(t_{0i}'-t)[\text{cm., sec.}^{-1}]$$

$$t_0' = \frac{30}{\pi N} \sum_{i=1}^{2} \sin^{-1} \frac{1}{R} \sqrt{\frac{r \cdot \Delta Ti}{\sin \phi}} \; [\text{sec.}]$$

respectively, wherein, $i$ qualifies the stage.

By way of example, the relationship between the angle $\phi$ and the effective compressing period in an embodiment in which a one stage compressing operation having $\Delta T=1.2$ cm., R=19.5 cm., $r=9$ cm., and N=24 r.p.m. and five graduations from 90° to 30° of the angle $\phi$ is carried out is illustrated in FIG. 2, and that between the angle $\phi$ and the compressing velocity of the same embodiment is likewise illustrated in FIG. 3, respectively. Furthermore, the comparison between the effective compressing period of the apparatus employing a pair of the frustum rollers and that employing two pairs of the plain rollers having parallel axes of rotation perpendicular to that of the turntable and arranged along said pitch circle, in which the 1st stage has various dimension whereas the 2nd stage has the same dimensions (9 cm.) and the upper and lower rollers of each stage are likewise confronting each other holding the turntable in between, is shown in the following Table I.

TABLE I

| | Frustum roller (one compression) | Plain roller (two stage compression) | | |
|---|---|---|---|---|
| | | Radii of the rollers | | |
| The angle ($\phi$) | Effective compressing period, sec. | 1st stage, cm. | 2nd stage, cm. | Effective compressing period, sec. |
| 70° | 0.069507 | | | |
| 60° | 0.072467 | 1 | 9 | 0.0710898 |
| 55° | 0.745102 | 2 | 9 | 0.0743550 |
| 50° | 0.077107 | 3 | 9 | 0.0776202 |
| 44° | 0.0810343 | 4 | 9 | 0.0807752 |
| 41° | 0.0833995 | 5 | 9 | 0.0838303 |
| 37° | 0.0871510 | 6 | 9 | 0.0867404 |
| 35° | 0.0892653 | 7 | 9 | 0.0895657 |
| 32° | 0.0929395 | 8 | 9 | 0.0923294 |
| 30° | 0.095767 | 9 | 9 | 0.0950728 |

In this connection, the relationships between the angle $\phi$ and the effective compressing period, and the relationship between the angle $\phi$ and the mean compressing velocity in a two stage compressing operation are illustrated in FIG. 4 and FIG. 5, respectively. Moreover, a comparison of the effective compressing periods of the apparatus employing two pairs of the frustum rollers and that employing three or four pairs of the plain rollers are summarized in the following Table II.

TABLE II

| Frustum roller (two stage compressing operation) | | Plain roller | |
|---|---|---|---|
| The angle ($\phi$) | Effective compressing period [sec.] | Stages | Effective compressing period |
| 60° | 0.1071708 | 2 | 0.095728 |
| 45° | 0.113167 | 3 | 0.116311 |
| 30° | 0.134747 | 4 | 0.134256 |

Taking the foregoing results into account, the present inventors have now discovered the fact that the smaller the angle $\phi$, the longer the effective compressing period and therefore the smaller the compressing velocity, and as can clearly be seen from the Table I, the effective compressing period of the machine with a frustum roller having an angle $\phi$ of 30° has a compression approximately equal to the total effective compressing period which is achieved by the machine having plain rollers of the same diameters. Likewise, a compressing performance which is the same as a plain roller operation of four stages can be achieved by a compressing operation employing two stages of frustum rollers.

Although the foregoing analysis has elucidated some of the important advantages of this invention in its several aspects, there are still other, more unique advantages of this invention.

The conical frustum rollers are mounted on the stationary body of the machine and the diameter and slant angle $\phi$ thereof are selected so that the center circles of the conical surfaces of the frustum rollers, when projected on a plane parallel to the surface of the turntable, coincide or at least approximately coincide with the pitch circle along which the punches travel in order to minimize the slip between the rollers and the root portions of the punches and to decrease the torsional stress exerted on the punches and the pinch effect of the operative heads of the punches inside the die cavities.

Therefore, the apparatus in accordance with this invention makes possible (1) a decrease in the wearing of the contacting surfaces of the rollers and the roots of the punches, (2) prevention of transfigurations of the die cavities, (3) facilitation of the production of non-circular tablets, (4) a drastic increase in the rotational frequency of the turntable, and (5) reduction of the shock effect exerted by the roller on the punches which override from the guide rail to the roller surface in the course of their travel; the overall effect of these improvements enables the prolongation of the life of the rollers and punches and the minimization of operational cost and noise. Referring now to the projection drawing of the rotational structure in FIG. 6, in which the integral body composed of the multiplicity of die cavities $2_1, 2_2, 2_3 \ldots 2_{26}$ (hereinafter, we shall refer to the die cavities 2 and the punches 5 and 6 by subindices from the left extreme of the drawing in order) and the turntable 1, is illustrated in this particular embodiment. It should however be noted that a multiplicity of die blocks each of which has a variety of die cavities can interchangeably be employed in accordance with the intended purpose of the specific operation.

Furthermore, for convenience of illustration, the whole rotatable structure, that is, the turntable 1 and the upper and lower punch blocks 3, 4 are represented as moving continuously from the left to the right of the drawing as indicated by the arrow and the right extremities thereof are to be connected to those at the left, although both members really rotate in unison. The punches 5, 6 are therefore to be transferred from the left to the right; the punches $5_{26}, 6_{26}$ at the right extreme are to follow the punches $5_1, 6_1$ at the left extreme.

On the other hand, the upper and lower rollers 7, 8, the feed shoe 9, the scraper blade 10, the deflecting baffle 11 and the upper and the lower guide rails 12, 13 both of which are really annular members are fixed with the stationary body of the machine.

In carrying out the operation of this invention in the arrangement of the apparatus illustrated in the drawings, the lower punches are operated as shown in the left half of the drawing, by the guide rail 13, which gives to the lower punches $6_1 \ldots 6_4$ a downward shifting with the auxiliary guidance of the sub-rail 13'.

At the position where the punches $6_4, 6_5$ are at their lowest extreme the die cavities $2_4, 2_5$ are filled with the material to be molded, for example powder or granular substance, which is intermittently charged through the feed shoe 9.

The elevating movement of the punches at their positions $6_6, 6_7$ effected by the action of the guide rail 13 causes the punches to push the surplus portion of the filled material up and over the upper surface of the turntable 1 from which it is scraped by the blade 10 of the feed shoe 9. The punches are lowered to their original levels by the guide rail 13 and sub-rail 13', and are transferred to their positions $6_{17}$ without axial movement while the punch block 4 is rotated.

The upper punches 5 hang on guide rail 12 until they are transferred to their relative positions $5_{17} \ldots 5_{22}$ by the rotation of the punch block 3, and begin to contact the conical surface of upper roller 7 at their root portions; the contact will cause a downward forced shifting of the punches which lead to the insertion of the operative heads of the punches 5 into the die cavities 2 for compacting and exerting the molding pressure upon the material 14 to be molded; the lower punches 6 at their relative positions $6_{17} \ldots 6_{22}$ at the same time being given a similar movement to cooperate with the upper punches.

The upper punches 5 will then be returned to their original level by the guide rail 12 by the rotation of the punch block 3; the lower punches 6 will meanwhile be elevated by the guide rail 13 at their relative positions $6_{23} \ldots 6_{26}$ to cause the ejection of the molded tablet from the die cavity 2 which tablet will then be swept away from the surface of the turntable to a container (not shown) by contact with the deflecting baffle 11.

The molded tablets produced by the machine employing frustum rollers in accordance with this invention are substantially free of capping and generally recognized to have a quality equal to those produced by machines employing conventional plain rollers which require twice the number of stages of compressing operations.

Although, a tableting machine having only one pair of rollers is exemplified in this specification, two or more pairs of rollers can be used in a single machine (machine of multiple stage compression) as well as two or more tableting lines operative in sequence can be provided in a single stationary body as is conventionally called a "double type machine," and any such improvement, modification and variation of this invention should be regarded as being within the scope of this invention.

We claim:

1. In an apparatus for producing molded articles, wherein said apparatus includes a stationary body, a rotational structure mounted on said body and having a multiplicity of annularly disposed die cavities, complementary upper and lower sets of punches each of which corresponds to and is operative within one of said die cavities, said sets of punches being transferable one behind the other in unison with said cavities and along substantially circular paths, each of said punches having a root, means for filling said cavities with material to be molded, means for effecting axial reciprocative movements of said upper and lower punches for compacting and molding said material, and annular guide rail means for effecting auxiliary movements of said punches for preparing said die cavities to receive said material and for ejecting the molded article from said die cavities; the improvement characterized in that said means for effecting axial reciprocative movements of said punches is at least one pair of conical frustum rollers confronting each other and mounted on said stationary body and having axes of rotation at an angle to the plane of rotation of said rotational structure, the conical surfaces of said rollers being in close contact with the roots of said punches.

2. An apparatus as claimed in claim 1, wherein the diameters and the mounting angles of said frustum rollers are such that the center circle of each of said conical surfaces of said frustum rollers, when projected on a plane parallel to the plane of rotation of said rotational structure, substantially coincides with the circular path along which said punches travel, whereby slip between the contacting surfaces thereof and said roots of punches is minimized.

References Cited
UNITED STATES PATENTS

| | | | |
|---|---|---|---|
| 2,043,086 | 6/1936 | Westin et al. | 18—20(T)X |
| 1,844,700 | 2/1932 | Stokes | 18—20T |
| 2,846,723 | 8/1958 | Frank | 18—20T |
| 2,989,781 | 6/1961 | Frank | 18—20T |
| 2,997,741 | 8/1961 | Crossley | 18—20T |
| 3,118,183 | 1/1964 | Gex et al. | 18—20T |

J. SPENCER OVERHOLSER, Primary Examiner